March 31, 1931.    G. B. WATKINS    1,799,075
PROCESS OF PRODUCING LAMINATED GLASS
Filed July 23, 1928
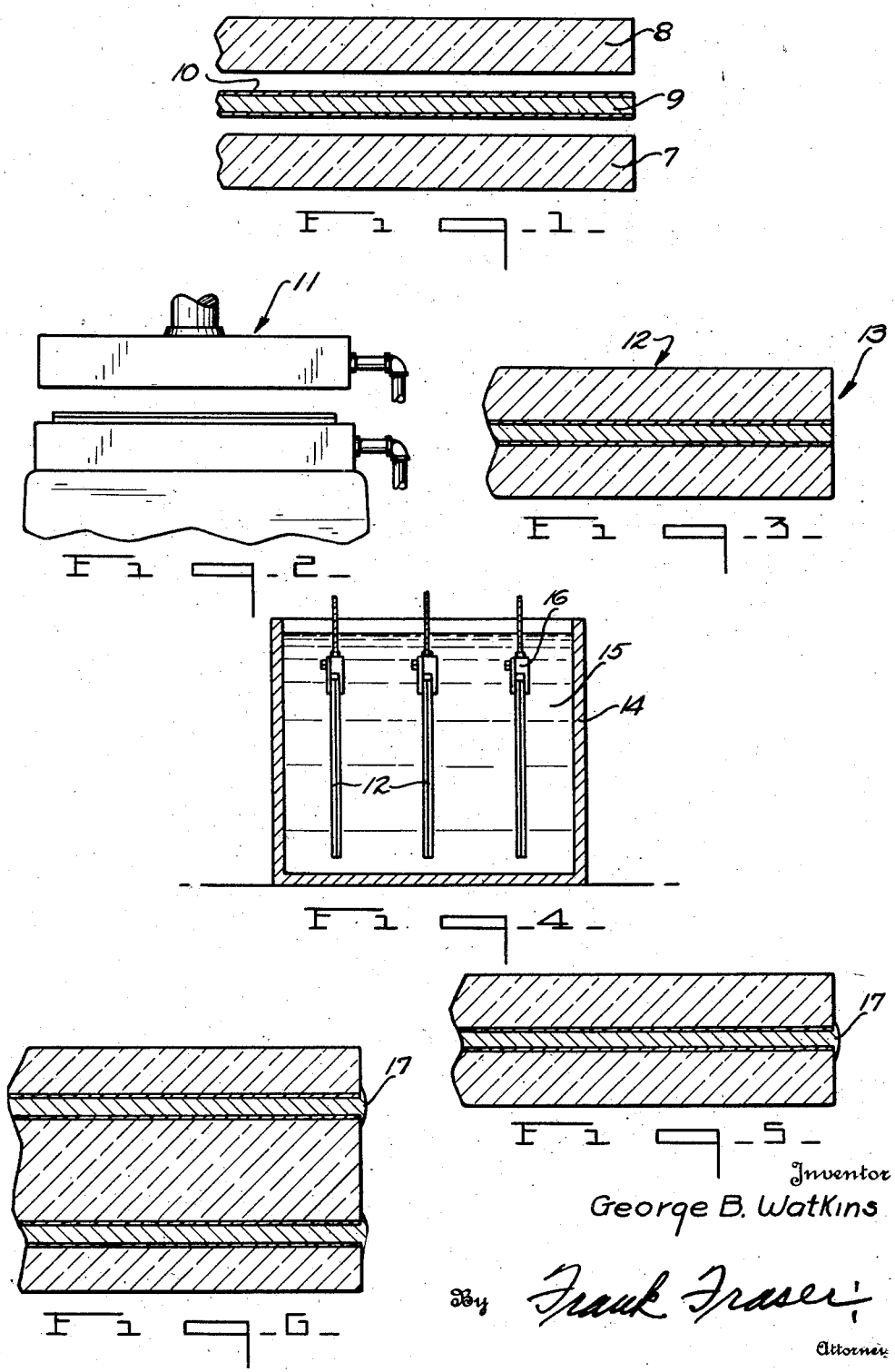
Inventor
George B. Watkins
By Frank Fraser
Attorney Patented Mar. 31, 1931

1,799,075

UNITED STATES PATENT OFFICE

GEORGE B. WATKINS, OF TOLEDO, OHIO, ASSIGNOR TO LIBBEY-OWENS-FORD GLASS COMPANY, OF TOLEDO, OHIO, A CORPORATION OF OHIO

PROCESS OF PRODUCING LAMINATED GLASS

Application filed July 23, 1928. Serial No. 294,856.

The present invention relates to laminated glass and to the process of producing the same.

An important object of the invention is to provide an improved process wherein laminated glass can be sealed without the usual steps of undercutting and introduction of a sealing material such as pitch.

A further object of the invention is to provide a process wherein the laminated sheet is sealed by being subjected to the action of a relatively high boiling point, low vapor pressure solvent or plasticizer without resorting to the customary method of mechanically removing a portion of the non-brittle membrane of the laminated sheet.

A still further object of the invention is to provide such a process wherein laminated glass, consisting of two or more sheets of glass and one or more non-brittle membranes interposed therebetween and united thereto, is sealed by treating the laminated sheet in a manner that the characteristics of the marginal portions of the non-brittle membrane or membranes are so changed that they will be made more plastic and will not tend to fail due to differential of expansion and contraction between the glass and plastic membrane.

Other objects and advantages of the invention will become more apparent during the course of the following description when taken in connection with the accompanying drawings.

In the drawings forming a part of this application and wherein like numerals are employed to designate like parts throughout the same, Fig. 1 is a fragmentary vertical section view showing the laminations before they are joined.

Fig. 2 represents diagrammatically a form of press which may be used.

Fig. 3 is a fragmentary vertical section of a form of product.

Fig. 4 is a vertical sectional view showing diagrammatically the treating of laminated sheets to produce a seal, and Figs. 5 and 6 are fragmentary sections of two different types of commercial product.

Laminated glass can be produced in accordance with different processes and by the use of various materials or ingredients. In most cases, however, it is desirable to seal the laminated sheet whereby to protect the bond between the laminations to overcome the tendency of "let-goes". Sheets of laminated glass even though properly joined at the time of manufacture will develop "let-goes" if the edges of the sheet are not sealed. The elements, etc. causing a separation of the laminations usually working from the edges inwardly of the sheet. "Let-goes" is a term used in the art to designate portions where the laminations have become separated and obviously if the laminations become separated the efficiency of the laminated sheet is greatly depreciated. In the past it has been customary to seal laminated glass by forming a channel around the laminated sheet and then placing a deposit of pitch or some similar substance in the channel as will be readily understood.

In accordance with the present invention two sheets of glass 7 and 8 in Fig. 1 may be joined to a non-brittle membrane by the aid of a suitable bonding liquid or the like 10. The use of a skin on the glass sheets can be resorted to as desired, as the present invention is in no way limited to the manner of joining the laminations together or the ingredients used. The laminations shown in Fig. 1 may be arranged in sandwich form which sandwich is placed in a press designated in its entirety by the numeral 11 where it is subjected to the combined action of heat and pressure sufficient to create an intimate bond between the various laminations.

In Fig. 3 is illustrated in section a sheet of glass 12 taken from the press 11. As illustrated the laminations are bonded together throughout their entire areas and it will be noted that the size of the non-brittle sheet 9 is identical with the size of the glass sheets so that their edges are all in alignment as indicated at 13.

Although the laminations are properly joined upon removal from the press, provided of course the press has been handled properly, as time goes on the sheet 12 may develop "let-goes". To protect the sheet, therefore, I have devised a new method of producing a seal. As shown the numeral 14 designates a suitable receptacle of sufficient capacity to contain a bath of liquid 15 in which may be submerged a plurality of laminated sheets 12. As it is customary to use a cellulose composition material as a non-brittle membrane of the sandwich the bath of material 15 preferred is triacetin, however there are other liquids and chemicals similar to triacetin, which have a relatively high boiling point, low vapor pressure. The sheets 12 may be suspended in the bath of triacetin or other similar liquid by the clamps 16. By way of example it is mentioned that the sheets 12 may be submerged in the triacetin bath for approximately thirty minutes. I have found that the non-brittle material will "flow" and produce a seal designated by the numeral 17 in Figs. 5 and 6. No mechanical treatment is required to form the seal, the action of the triacetin being sufficient. It seems that the non-brittle sheet naturally "flows" over the ends of the glass sheets as illustrated. The sheets are left in the solvent bath sufficiently long to cause the proper amount of material to "flow" to adequately cover the edges of the laminated sheet to produce an effective seal.

When the laminated sheet is subjected to the action of triacetin or other relatively high boiling point, low vapor pressure solvent or plasticizer, the triacetin or equivalent liquid softens the celluloid or other non-brittle membrane which causes a swelling or flowing thereof. At the same time the solvent replaces, so to speak, the camphor in the pyroxylin plastic around the marginal portions and in that respect produces a marginal border which is more plastic than the original pyroxylin plastic which will resist atmospheric elements better than nitro-cellulose colloidized with camphor, because camphor has a very high vapor pressure at normal temperatures and will gradually leave the plastic at the exposed edge causing a shrinkage with subsequent breaking of the bond causing development of let-goes, whereas a high boiling point, low vapor pressure solvent such as triacetin or the like will remain considerably longer in the plastic, thus materially prolonging the life of the laminated sheet. Furthermore, the triacetin of similar solvent is more tolerant to water than camphor. Camphor is mentioned above because it is most commonly used to colloidize nitro-cellulose to produce commercial sheets of celluloid or pyroxylin plastic sheets.

By making the marginal portions of the non-brittle membrane more plastic, they will not tend to fail due to differential of expansion and contraction between the glass and plastic membrane. The length of time the laminated sheet is subjected to the solvent action is dependent, among other things, upon the depth of penetration desired and temperature of the solvent. Under ordinary circumstances, the marginal treatment of the non-brittle membrane will not be great and probably not over one-quarter of an inch inwardly of the laminated sheet edges, although, of course, the exact distance can be varied as is deemed advisable. It may also be desirable to place the laminated sheet and solvent under pressure during such treatment to accelerate the action thereof, although this is not essential. The solvent will penetrate substantially equally throughout.

I claim:

1. The process of sealing laminated glass having a layer of cellulose composition material, consisting in subjecting the laminated sheets to the action of a cellulose composition material solvent bath sufficiently long to cause a "flowing" of the cellulose composition material sheet to form a seal.

2. The process of sealing laminated glass having a layer of cellulose composition material, consisting in immersing the sheet into a bath of cellulose composition material solvent for a sufficient length of time to cause a "flowing" of the cellulose composition material sheet over the edges of the laminated sheet whereby to produce a seal.

3. The process of sealing laminated glass, consisting in immersing the sheet into a bath of triacetin for a sufficient length of time to cause a "flowing" of the non-brittle sheet over the edges of the laminated sheet whereby to produce a seal.

4. The process of sealing laminated glass comprising two sheets of glass and a sheet of non-brittle material, consisting in subjecting the laminated sheet to the action of a relatively high boiling point, low vapor pressure solvent in a manner that the solvent will act upon the marginal portions of the non-brittle sheet for a relatively short distance inwardly of the edges thereof, the action of the solvent being so controlled that the marginal portions of the non-brittle sheet affected will be made more plastic.

5. The process of sealing laminated glass comprising two sheets of glass and a sheet of non-brittle material, consisting in subjecting the laminated sheet to the action of a relatively high boiling point, low vapor pressure solvent in a manner that the solvent will act upon the marginal portions of the non-brittle sheet for a relatively short distance inwardly of the edges thereof, the action of the solvent being so controlled that the marginal portions of the non-brittle sheet will be rendered more resistant to the action of the atmosphere.

6. The process of sealing laminated glass comprising two sheets of glass and a sheet of non-brittle material, consisting in subjecting the laminated sheet to the action of a relatively high boiling point, low vapor pressure solvent in a manner that the solvent will act upon the marginal portions of the non-brittle sheet for a relatively short distance inwardly of the edges thereof, the solvent replacing, so to speak, the plasticizer in the non-brittle material so that the said marginal portions thereof will be made more plastic.

7. In the process of manufacturing laminated glass having a sheet of non-brittle material interposed between two sheets of glass, the steps of pressing the sheets of glass and the non-brittle material together, and thereafter subjecting the edge portions of the laminated sheet to the action of a relatively high boiling point, low vapor pressure solvent in a manner that the solvent will act upon the marginal portions of the non-brittle sheet for a relatively short distance inwardly of the edges thereof to make the marginal portions more plastic.

8. In the process of manufacturing laminated glass having a layer of cellulose composition material interposed between two sheets of glass, the steps of pressing the sheets of glass and the cellulose composition material together, and thereafter immersing the sandwich thus formed in a bath consisting of a relatively high boiling point, low vapor pressure solvent for a sufficient length of time to cause the solvent to act upon the marginal portions of the cellulose composition material for a relatively short distance inwardly of the edges thereof to make the marginal portions more plastic.

Signed at Toledo, in the county of Lucas, and State of Ohio, this 20th day of July, 1928.

GEORGE B. WATKINS.